(12) United States Patent
Konno et al.

(10) Patent No.: US 8,610,045 B2
(45) Date of Patent: Dec. 17, 2013

(54) ANALOG SIGNAL BUFFER AND IMAGE READING DEVICE USING THE ANALOG SIGNAL BUFFER

(75) Inventors: Yoshio Konno, Kanagawa (JP); Masamoto Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 323 days.

(21) Appl. No.: 13/150,563

(22) Filed: Jun. 1, 2011

(65) Prior Publication Data
US 2012/0008173 A1    Jan. 12, 2012

(30) Foreign Application Priority Data

Jul. 6, 2010    (JP) .................................. 2010-153556

(51) Int. Cl.
*H01J 40/14*    (2006.01)
(52) U.S. Cl.
USPC ..................................................... 250/214 R
(58) Field of Classification Search
USPC ..................................................... 250/214 R
See application file for complete search history.

(56) References Cited

U.S. PATENT DOCUMENTS

| | | | | |
|---|---|---|---|---|
| 3,958,169 | A | * | 5/1976 | Hergenhan ....................... 363/23 |
| 5,990,731 | A | * | 11/1999 | Yoshida .......................... 327/545 |
| 7,821,682 | B2 | | 10/2010 | Nakazawa et al. |
| 2007/0188638 | A1 | * | 8/2007 | Nakazawa et al. ............. 348/294 |
| 2008/0252787 | A1 | | 10/2008 | Nakazawa et al. |
| 2010/0171998 | A1 | | 7/2010 | Nakazawa |
| 2011/0051201 | A1 | | 3/2011 | Hashimoto et al. |
| 2011/0063488 | A1 | | 3/2011 | Nakazawa |

FOREIGN PATENT DOCUMENTS

| | | |
|---|---|---|
| JP | 2007-151343 | 6/2007 |
| JP | 4565567 | 8/2010 |

OTHER PUBLICATIONS

Extended European Search Report issued Jul. 27, 2011, in Patent Application No. 11169211.7.
Albert Paul Malvino, Ph.D, "Electronic Principles", McGraw-Hill, XP007919097, 1980, pp. 300-301 (with English-language translation).
Dieter Nührmann, "A Manual of Electronics", XP007919111, 1984, pp. 973-974 (with English-language translation).

* cited by examiner

*Primary Examiner* — Thanh Luu
(74) *Attorney, Agent, or Firm* — Oblon, Spivak, McClelland, Maier & Neustadt, L.L.P.

(57) ABSTRACT

The analog signal buffer is connected with a photoelectric converter to convert an optical image to an analog signal and an analog signal processing circuit to convert the analog signal to a digital signal, and transmits the analog signal to the analog signal processing circuit. The analog signal buffer includes a first buffer having a NPN transistor; and a second buffer having a PNP transistor. The first buffer includes a circuit to block a reverse current caused in the analog signal buffer by dropping of a voltage output from the photoelectric converter.

8 Claims, 5 Drawing Sheets

ANALOG SIGNAL BUFFER AND IMAGE READING DEVICE USING THE ANALOG SIGNAL BUFFER

BACKGROUND OF THE INVENTION

1. Field of the Invention

The present invention relates to an analog signal buffer, and an image reading device using the analog signal buffer.

2. Description of the Related Art

Digital image forming devices such as digital copiers typically produce image data using the following method:

(1) irradiating an original document using an optical scanning system;
(2) converting light reflected from the original document to analog electric signals using a photoelectric converter such as a CCD image sensor (hereinafter referred to as a CCD);
(3) performing various analog processings on the analog electric signals; and
(4) converting the processed analog electric signals to digital data (i.e., performing an A/D conversion processing).

The processings performed on the analog electric signals and the A/D conversion processing are typically performed by an analog front end (AFE), which is an integrated circuit.

An output from a CCD is typically input to an AFE using an AC coupling, and change of the AC components of the output voltage is transmitted to the AFE. In this regard, it is necessary that the voltage input to the AFE is maintained so as to be not greater than the maximum rated voltage of the AFE, and it is satisfied as long as a normal operation is performed. However, when a power-on operation is performed, an excessive voltage is generated, and it is possible that the voltage input to the AFE becomes greater than the maximum rated voltage of the AFE.

FIG. 6 is a view illustrating change of the voltage output by a CCD when a power is supplied to the CCD. As illustrated in FIG. 6, when a power is supplied to the CCD, an output voltage (Vout) from the CCD exceeds a normal offset level of CCD and increases so as to be close to the supply voltage (Vccd) as the supply voltage (Vccd) for the CCD increases. The output voltage (Vout) rapidly drops so as to be close to the ground level (GND) when reset cancellation is performed. The mechanism of this voltage dropping is that charges, which are stored in the photoelectric converter of the CCD due to dark current therein before a power is supplied to the CCD, are discharged at a time when reset cancellation is performed. As illustrated in FIG. 6, after being dropped by the reset cancellation, the output voltage (Vout) is stabilized at the normal offset level.

When the output voltage from a CCD is thus elevated sharply as illustrated in FIG. 6, a risk of deteriorating the properties of the devices constituting the CCD or damaging the devices themselves seriously increases. In attempting to solve the problem, there is a proposal for an analog signal buffer which uses a delay circuit for delaying rise in the power supply voltage to prevent sharp increase of the voltage (Vout) output from a CCD to an AFE. By using such an analog signal buffer, damaging of the AFE caused by the excessive voltage of the CCD can be avoided, but generation of the reverse current caused by the above-mentioned dropping of the output voltage of the CCD cannot be prevented.

For these reasons, the present inventors recognized that there is a need for an analog signal buffer which prevents an AFE from receiving an excess voltage from a CCD while preventing the CCD from receiving a reverse current.

SUMMARY

This patent specification describes a novel analog signal buffer, one embodiment of which is connected with a photo-electric converter to convert an optical image to an analog electric signal and an analog signal processing circuit to convert the analog electric signal to a digital signal, to transmit the analog electric signal to the analog signal processing circuit and which includes a first buffer having a NPN transistor and a second buffer having a PNP transistor. The first buffer includes a circuit to block a reverse current caused in the analog signal buffer by dropping of the voltage output from the photoelectric converter.

This patent specification describes a novel image reading apparatus, one embodiment of which includes an irradiator to irradiate an object with light; a photoelectric converter to convert an optical image to an analog signal; an analog signal processing circuit to convert the analog signal to a digital signal; and the above-mentioned analog signal buffer connected with the photoelectric converter and the analog signal processing circuit to transmit the analog signal to the analog signal processing circuit.

BRIEF DESCRIPTION OF THE DRAWINGS

A more complete appreciation of aspects of the invention and many of the attendant advantage thereof will be readily obtained as the same become better understood by reference to the following detailed description when considered in connection with the accompanying drawings, wherein.

DESCRIPTION OF THE PREFERRED EMBODIMENTS

The analog signal buffer of the present invention is connected with a photoelectric converter to convert an optical image to an analog signal and an analog signal processing circuit (i.e., AFE) to convert the analog signal to a digital signal, to transmit the analog signal to the analog signal processing circuit. The analog signal buffer includes a first buffer having a NPN transistor, a second buffer having a PNP transistor, and a circuit having a diode or a combination of a diode and a resistor, which is connected with a base of the NPN transistor of the first buffer and an emitter thereof. Alternatively, the circuit may be a resistor having an end connected with the emitter of the of the NPN transistor of the first buffer and another end connected to ground. Use of the analog signal buffer prevents flow of an excess voltage through the AFE while preventing flow of a reverse current through the CCD, resulting in prevention of occurrence of a problem in that the CCD and the devices constituting the analog signal buffer such as transistors are damaged by the reverse current.

The present invention will be described by reference to several examples, but the present invention is not limited thereto.

Figure 1:
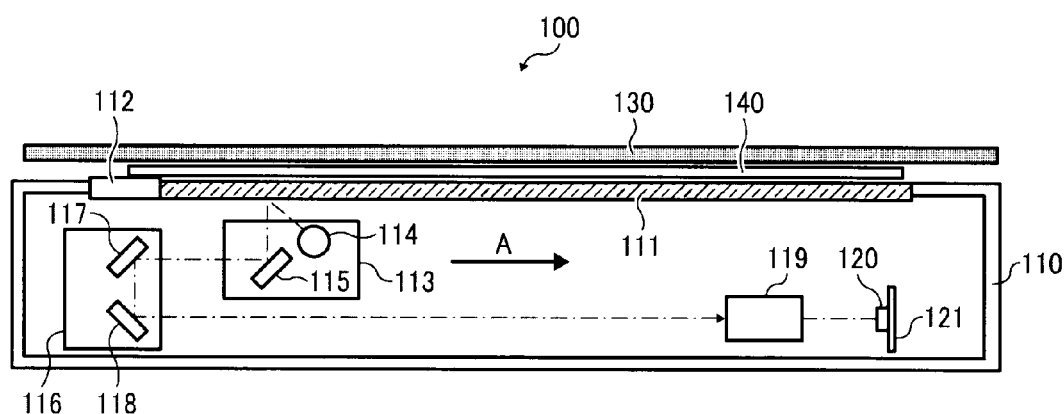
FIG. 1 is a schematic view illustrating an example of the image reading device of the present invention.

FIG. 1 is a schematic view illustrating an example of the image reading device of the present invention.

Referring to FIG. 1, an image reading device 100, which can serve as an image reading device of image forming apparatuses such as multiple function printers (MFPs), includes a main body 110 of a scanner, and a cover 130. The main body 110 of the scanner includes a glass table 111, a white reference plate 112, a first carriage 113, a second carriage 116, a lens unit 119, a CCD 120 and a sensor board unit 121.

The glass table 111 is a glass plate on which an original document 140 to be scanned is set while covered by the cover 130. A scanning light beam emitted by a light source 114 in the first carriage 113 irradiates the original document 140 through the glass table 111. The white reference plate 112 is arranged so as to be adjacent to the glass table 111 and is irradiated with the scanning light beam before the scanning light beam irradiates the original document 140 to check whether or not the light quantity and the color of the light beam change and to make various corrections in the scanning operation based on the results of the checking.

The first carriage 113 is a movable carriage emitting a scanning light beam, and includes the light source 114 and a reflection mirror 115. The first carriage 113 irradiates the original document 140 with the scanning light beam while moving in a sub-scanning direction (i.e., in a direction A). The second carriage 116 is a movable carriage to reflect light, which is reflected from the original document 140, on the lens unit 119 while moving in the sub-scanning direction (i.e., in the direction A), and includes a first reflection mirror 117, and a second reflection mirror 118.

The lens unit 119 receives the scanning light beam from the second carriage 116, and focuses the scanning light beam on the CCD 120 (i.e., forms an optical image on the CCD). The CCD 120 detects the optical image formed on the light receiving surface thereof and converts the optical image to charges (i.e., performs photoelectric conversion), resulting in formation of analog electric signals. The CCD 120 is integrated into the sensor board unit 121 mentioned below.

In the image reading device illustrated in FIG. 1, the first carriage 113, the second carriage and the lens unit 119 serve as an irradiator to irradiate an original document with light.

Figure 2:
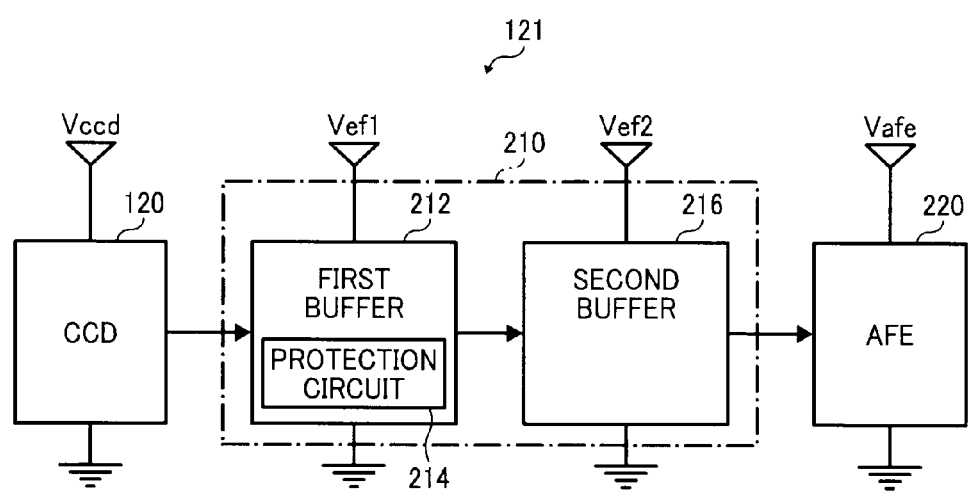
FIG. 2 is a schematic view illustrating a sensor board unit for use in the image reading device of the present invention.

FIG. 2 illustrates configuration of the sensor board unit 121. The sensor board unit 121 includes the CCD 120, an analog signal buffer 210, and an analog signal processing circuit 220 (i.e., analog front end (AFE)).

The analog signal buffer 210 serves as a buffer, which transmits the analog electric signals output from the CCD 120 to the AFE 220, and includes a first buffer 212 and a second buffer 216. The first buffer 212 is a buffer circuit, which processes the signals output from the CCD 120 and sends the processed signals to the second buffer 216, and includes a NPN transistor. In addition, the first buffer 212 includes a protection circuit 214 to block a reverse current caused by dropping of the output voltage (Vout) of the CCD 120. The second buffer 216 is a buffer circuit, which processes the signals output from the first buffer 212 and sends the processed signals to the AFE 220, and includes a PNP transistor.

The AFE 220 is a circuit, which converts the analog image data received from the analog signal buffer 210 to digital data. Thus, the signals output from the CCD 120 are input to the AFE 220 in the form of the output signals from the analog signal buffer 210 as illustrated in FIG. 2.

Figure 3:
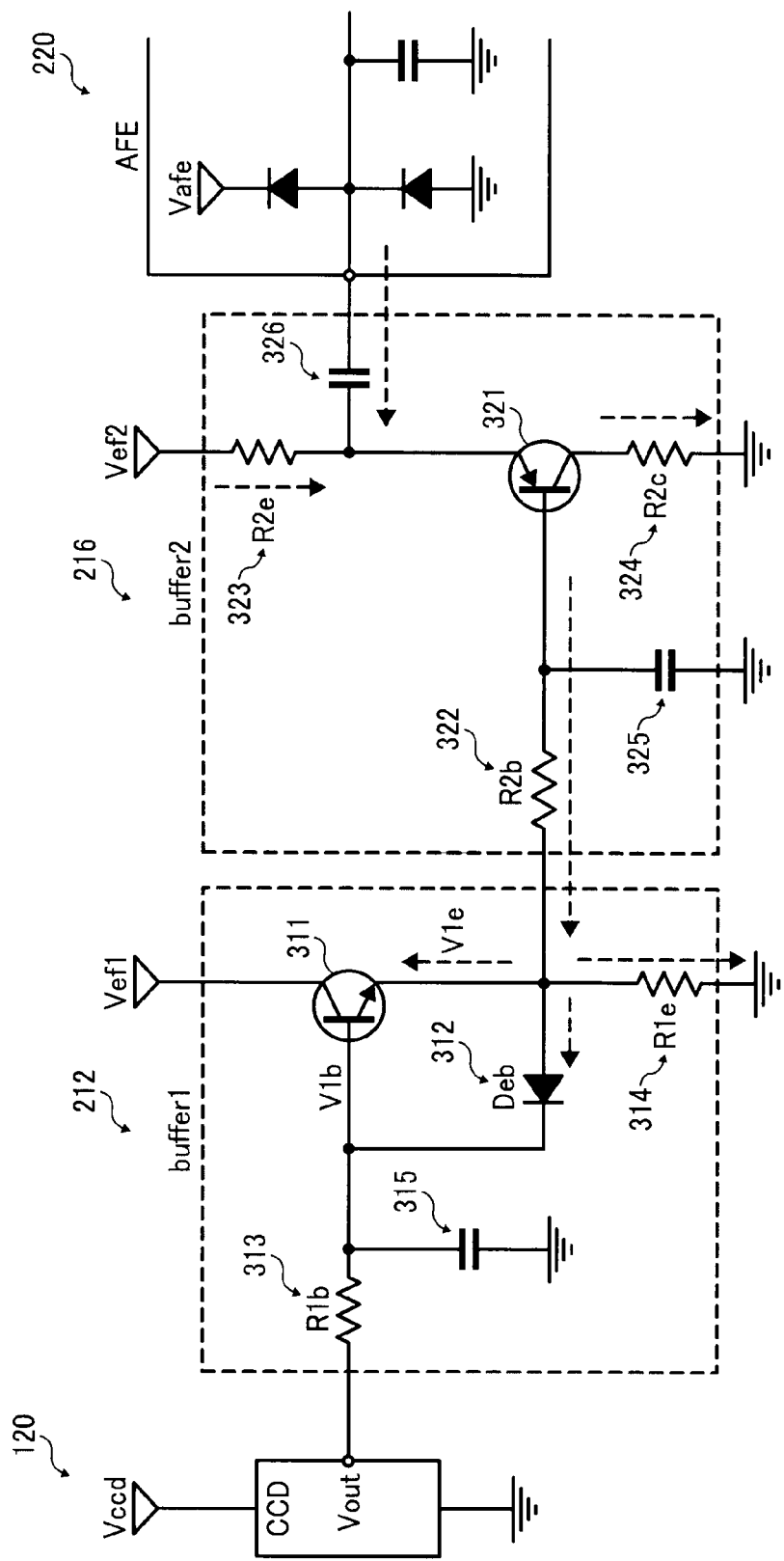
FIG. 3 is a circuit diagram illustrating an example of the sensor board unit illustrated in FIG. 2.

FIG. 3 illustrates an example of the sensor board unit 121. Hereinafter, the first and second buffers 212 and 216 of the example of the sensor board unit will be described by reference to FIG. 3.

The first buffer 212 includes a transistor 311, a diode 312, resistors 313 and 314, and a condenser 315. The transistor 311 is a NPN transistor, and a power supply voltage (Vef1) supplied to the first buffer 212 is applied to a collector of the transistor The diode (Deb) 312 is connected with a base and an emitter of the transistor 311. In this example, the diode 312 preferably has a voltage resistance of not less than tens of volts.

The resistor (R1$b$) 313 is connected with the CCD 120 and the base of the transistor 311. One end of the resistor (R1$e$) 314 is connected with the emitter of the transistor 311, and the other end thereof is grounded.

The second buffer 216 includes a transistor 321, resistors 322, 323 and 324, a condenser 325, and a coupling condenser 326. The transistor 321 is a PNP transistor, and a power supply voltage (Vef2) supplied to the second buffer 216 is applied to an emitter of the transistor. The resistor (R2$b$) 322 is connected with the first buffer 212 and the transistor 321. The resistor (R2$e$) 323 is connected with the emitter of the transistor 321 and the power source for the second buffer 216. One end of the resistor (R2$c$) 324 is connected with the collector of the transistor 321, and the other end thereof is grounded. One end of the condenser 325 is connected with the resistor (R2$b$) 322 and the transistor 321, and the other end thereof is grounded. One end of the coupling condenser 326 is connected with the resistor (R2$e$) 323 and the emitter of the transistor 321, and the other end thereof is connected with the AFE 220.

The output signals from the CCD 120 are input to the base of the transistor 311 via the resistor (R1$b$) 313 of the first buffer 212, and sent to the second buffer 216 from an end of the resistor (R1$e$) 314 connected with the emitter of the transistor 311. The output signals from the CCD 120 are then input to the base of the transistor 321 via the resistor (R2) 322 of the second buffer 216, and sent to the AFE 220 via the coupling condenser 326 from an end of the resistor (R2$e$) 323 connected with the emitter of the transistor 321.

In FIG. 3, broken line arrows represent flow of currents caused by dropping of the output voltage (Vout) of the CCD 120. In this example, the diode (Deb) 312 serves as a protection circuit, and absorbs a reverse bias to the transistor 311, which is caused by dropping of the output voltage (Vout) of the CCD 120, by clamping, thereby preventing flow of a reverse current through the transistor 311 and the CCD 120.

In this example, when the output voltage of the CCD 120 is excessively increased just after a power is supplied to the CCD, the resistor (R2$c$) 324 temporarily saturates the current flowing through second buffer 216, thereby limiting the current flowing through the AFE 220.

Figure 4:
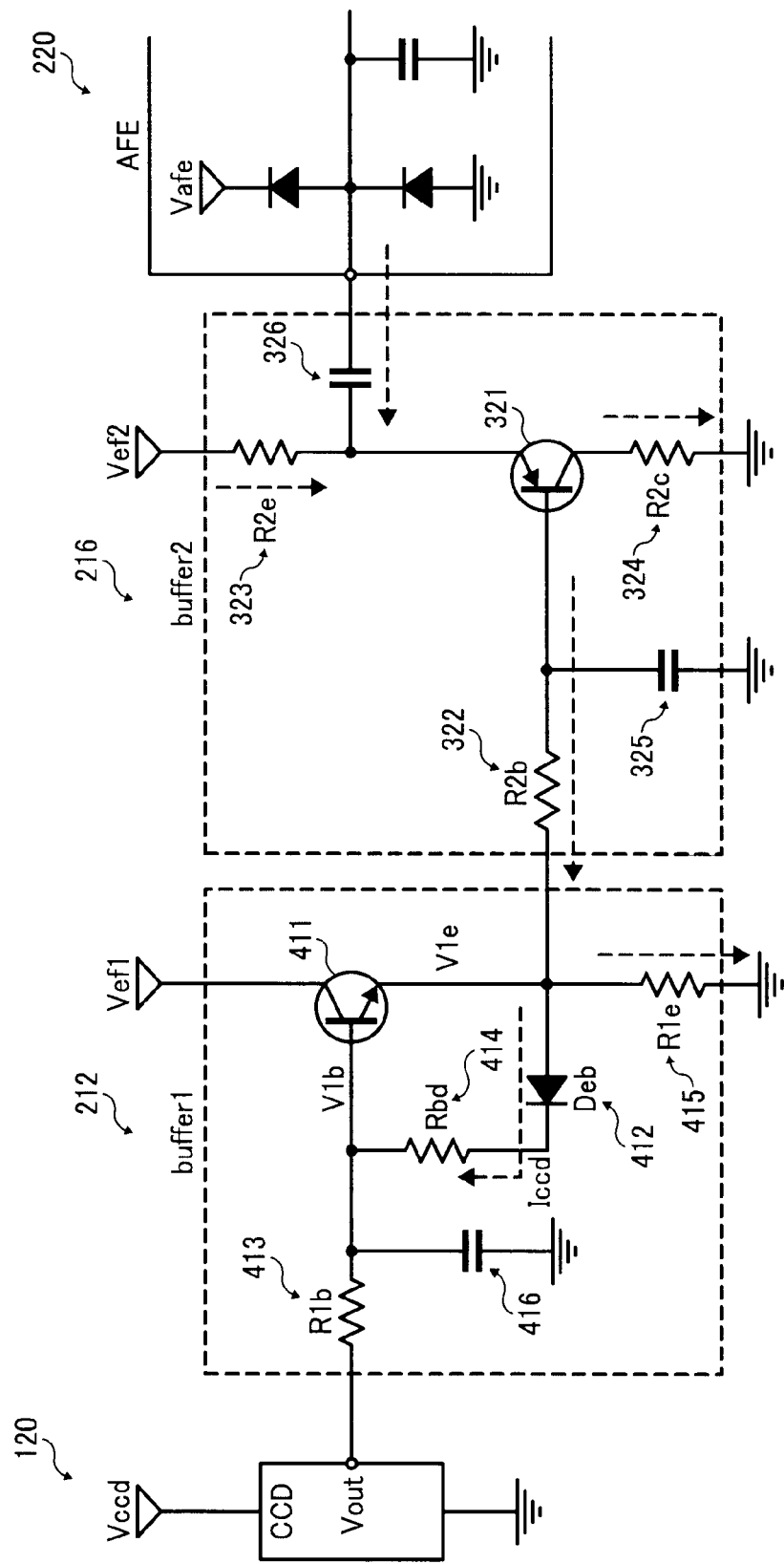
FIG. 4 is a circuit diagram illustrating another example of the sensor board unit.

FIG. 4 illustrates another example of the sensor board unit 121. Hereinafter, the first buffer 212 of the example of the sensor board unit 121 will be described by reference to FIG. 4. In this regard, the configuration of the second buffer 216 illustrated in FIG. 4 is the same as that of the second buffer illustrated in FIG. 3, the description thereof is omitted.

Referring to FIG. 4, the first buffer 212 includes a transistor 411, a diode 412, resistors 413, 414 and 415, and a condenser 416. The transistor 411 is a NPN transistor, and the power supply voltage (Vef1) supplied to the first buffer 212 is applied to a collector of the transistor. The diode (Deb) 412 is connected with the base of the transistor 411 and the emitter thereof.

The resistor (R1$b$) 413 is connected with the CCD 120 and the transistor 411. The resistor (Rbd) 414 is connected with the base of the transistor 411 and the cathode of the diode (Ded) 412. One end of the resistor (R1$e$) 415 is connected with the emitter of the transistor 411, and the other end thereof is grounded. One end of the condenser 416 is connected with the resistor (R1$b$) 413 and the base of the transistor 411, and the other end thereof is grounded.

In FIG. 4, broken line arrows represent flow of currents caused by dropping of the output voltage (Vout) of the CCD 120. In this example, the diode (Deb) 412 and the resistor (Rbd) 414 serve as a protection circuit, and a current Iccd, which may flow into the CCD 120 via the diode 412 when the voltage resistance of the diode 412 is relatively low, can be blocked by the resistor (Rbd) 414.

Figure 5:
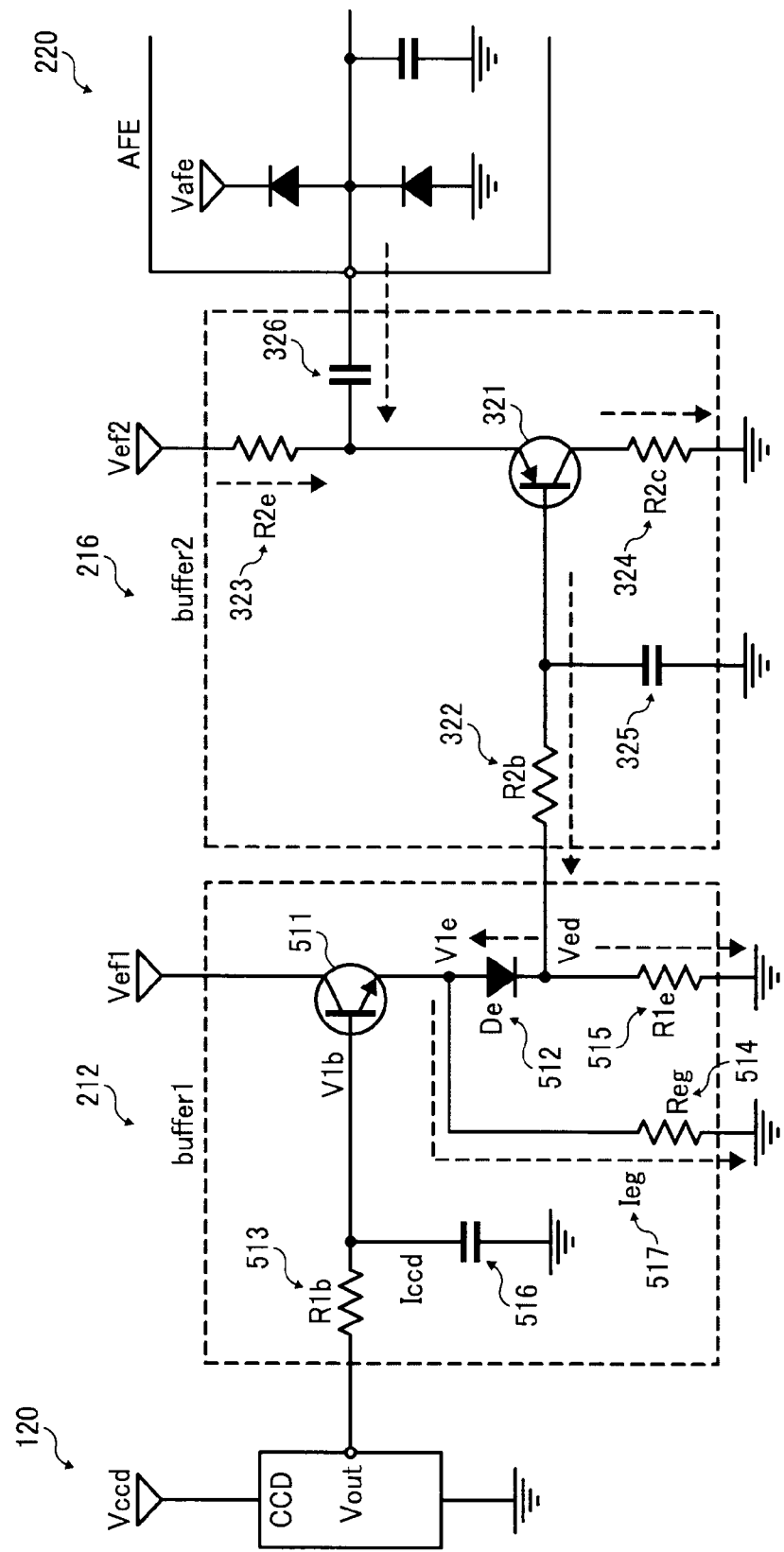
FIG. 5 is a circuit diagram illustrating yet another example of the sensor board unit.
Figure 6:
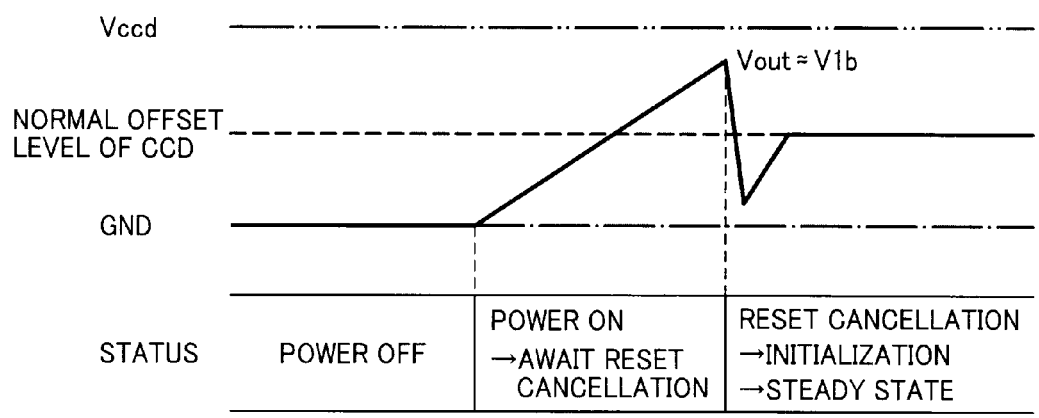
FIG. 6 is a schematic view illustrating change of the voltage output by a CCD when a power is supplied to the CCD.

FIG. 5 illustrates yet another example of the sensor board unit. Hereinafter, the first buffer 212 of the example of the sensor board unit will be described by reference to FIG. 5. In this regard, the configuration of the second buffer 216 illustrated in FIG. 5 is the same as that of the second buffer illustrated in FIG. 3, the description thereof is omitted.

The first buffer 212 includes a transistor 511, a diode 512, resistors 513, 514 and 515, and a condenser 516. The transistor 511 is a NPN transistor, and a power supply voltage (Vef1) supplied to the first buffer 212 is applied to a collector of the transistor. The diode (De) 512 is connected with the emitter of the transistor 511. The resistor (R1b) 513 is connected with the CCD 120 and the transistor 511. One end of the resistor (Reg) 514 is connected with the emitter of the transistor 511 and the anode of the diode (De) 512, and the other end thereof is grounded. One end of the resistor (R1e) 515 is connected with the emitter of the transistor 511 on the emitter side of the diode (De) 512, and the other end thereof is grounded. One end of the condenser 516 is connected with the resistor (R1b) 513 and the base of the transistor 511, and the other end thereof is grounded.

In this example, a current is flown into the diode (De) 512 via the transistor 511, and therefore the resistance of the resistor (Reg) 514 is preferably greater than that of the diode (De) 512. The diode (De) 512 preferably has a voltage resistance of not less than tens of volts.

In FIG. 5, broken line arrows represent flow of currents caused by dropping of the output voltage (Vout) of the CCD 120. In this example, the diode (De) 512 and the resistor (Rbd) 514 serve as a protection circuit, and escape part (Ieg) 517 of the reverse current caused by dropping of the output voltage (Vout) of the CCD 120. Therefore, the voltage (V1b) on the base side of the transistor can be maintained so as to be greater than the voltage (V1e) on the emitter side of the transistor, thereby preventing flow of the reverse current into the transistor 511 and the CCD 120.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2010-153556, filed on Jul. 6, 2010, the entire contents of which are herein incorporated by reference.

What is claimed is:

1. An analog signal buffer connected with a photoelectric converter to convert an optical image to an analog signal and an analog signal processing circuit to convert the analog signal to a digital signal, to transmit the analog signal to the analog signal processing circuit, comprising:
a first buffer including:
a NPN transistor; and
a circuit to block a reverse current caused in the analog signal buffer by dropping of a voltage output from the photoelectric converter, the circuit including a diode connected to a base and an emitter of the NPN transistor, the diode connected through at least one resistor to an output of the photoelectric converter; and
a second buffer including:
a PNP transistor.

2. The analog signal buffer according to claim 1, wherein the circuit includes:
a combination of the diode and a resistor, which is connected with the base and the emitter of the NPN transistor of the first buffer.

3. The analog signal buffer according to claim 1, wherein the circuit includes:
a resistor having a first end connected with the emitter of the NPN transistor of the first buffer, and a second end connected to ground.

4. The analog signal buffer according to claim 1, wherein the second buffer includes:
a resistor to saturate a current flowing through the second buffer when a voltage output from the photoelectric converter becomes greater than a maximum rated voltage of the analog signal processing circuit.

5. An image reading device comprising:
an irradiator to irradiate an object with light;
a photoelectric converter to receive an optical image of the object while converting the optical image to an analog signal;
an analog signal processing circuit to convert the analog signal to a digital signal; and
the analog signal buffer according to claim 1 connected with the photoelectric converter and the analog signal processing circuit to transmit the analog signal to the analog signal processing circuit.

6. An analog signal buffer connected with a photoelectric converter to convert an optical image to an analog signal and an analog signal processing circuit to convert the analog signal to a digital signal, to transmit the analog signal to the analog signal processing circuit, comprising:
a first buffer including:
a NPN transistor; and
means for blocking a reverse current caused in the analog signal buffer by dropping of a voltage output from the photoelectric converter, the means for blocking including a diode connected to a base and an emitter of the NPN transistor, the diode connected through at least one resistor to an output of the photoelectric converter; and
a second buffer including:
a PNP transistor.

7. The analog signal buffer according to claim 1, wherein the first buffer further includes a capacitor connected between the base of the NPN transistor and ground.

8. The analog signal buffer according to claim 6, wherein the first buffer further includes a capacitor connected between the base of the NPN transistor and ground.

* * * * *